April 3, 1928.
M. PLANESS
PLOW
Filed May 23, 1924
1,665,041
3 Sheets-Sheet 1
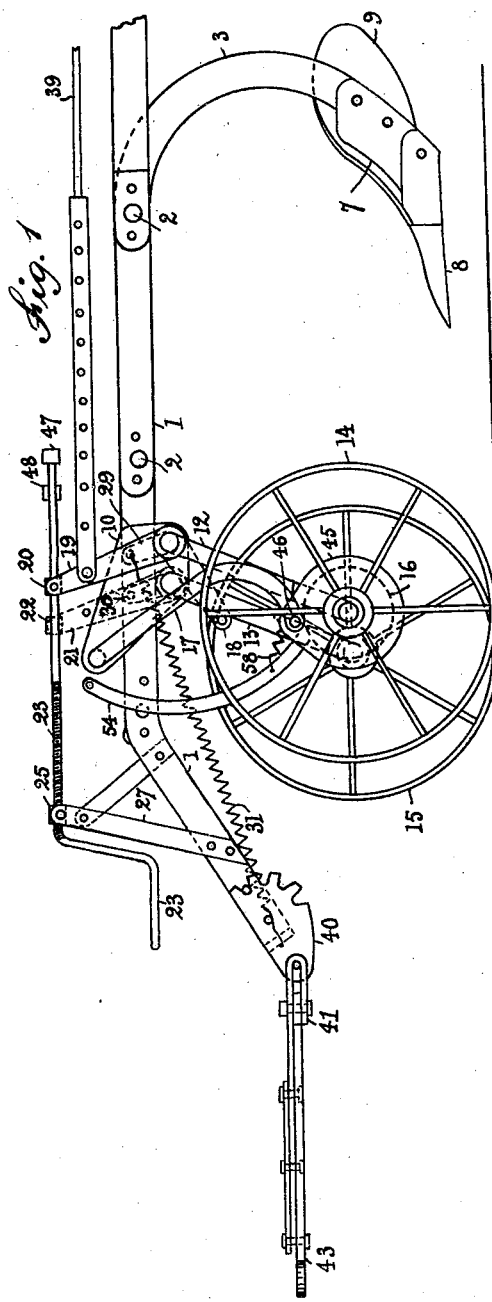
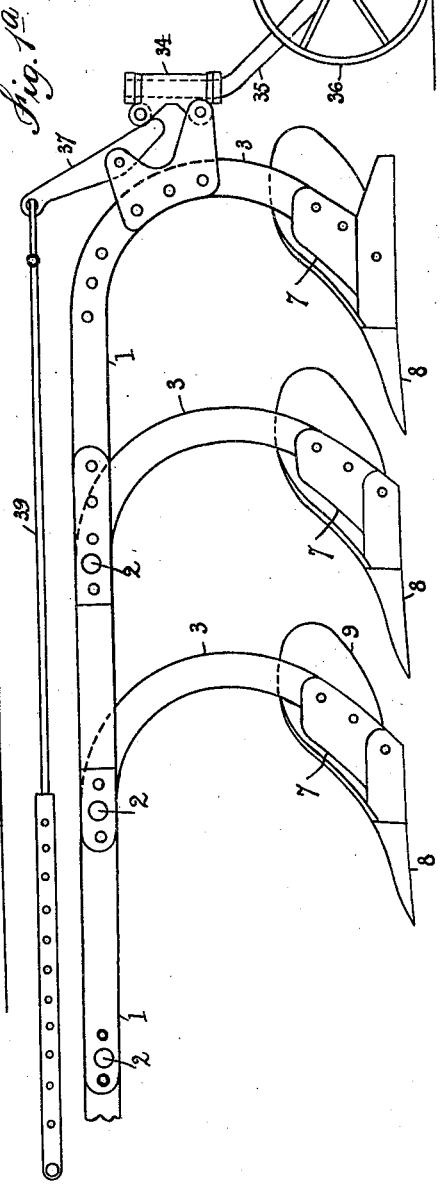
Inventor:
Maurice Planess
By [signature]
Atty.

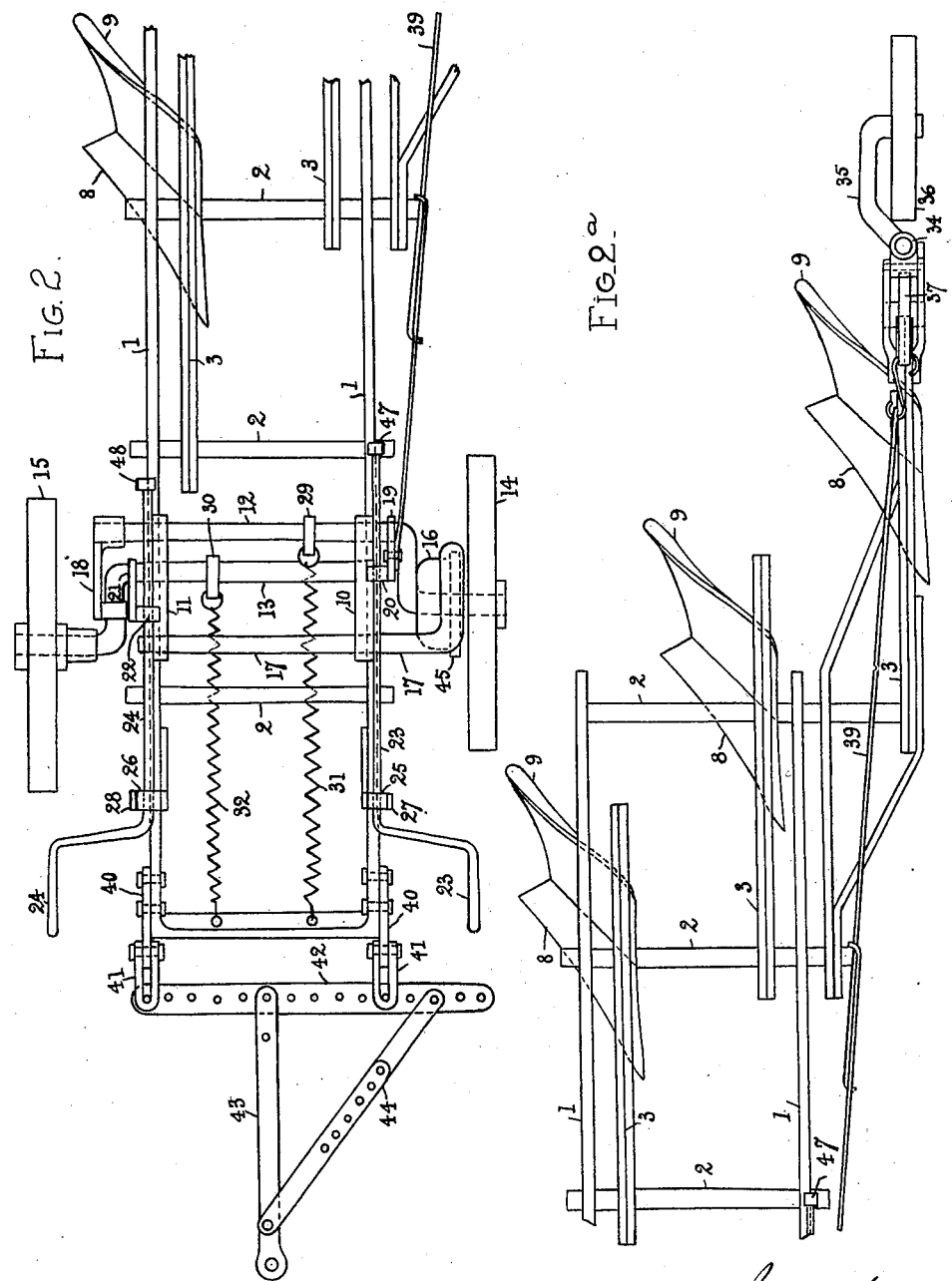

April 3, 1928. 1,665,041
M. PLANESS
PLOW
Filed May 23, 1924 3 Sheets-Sheet 3
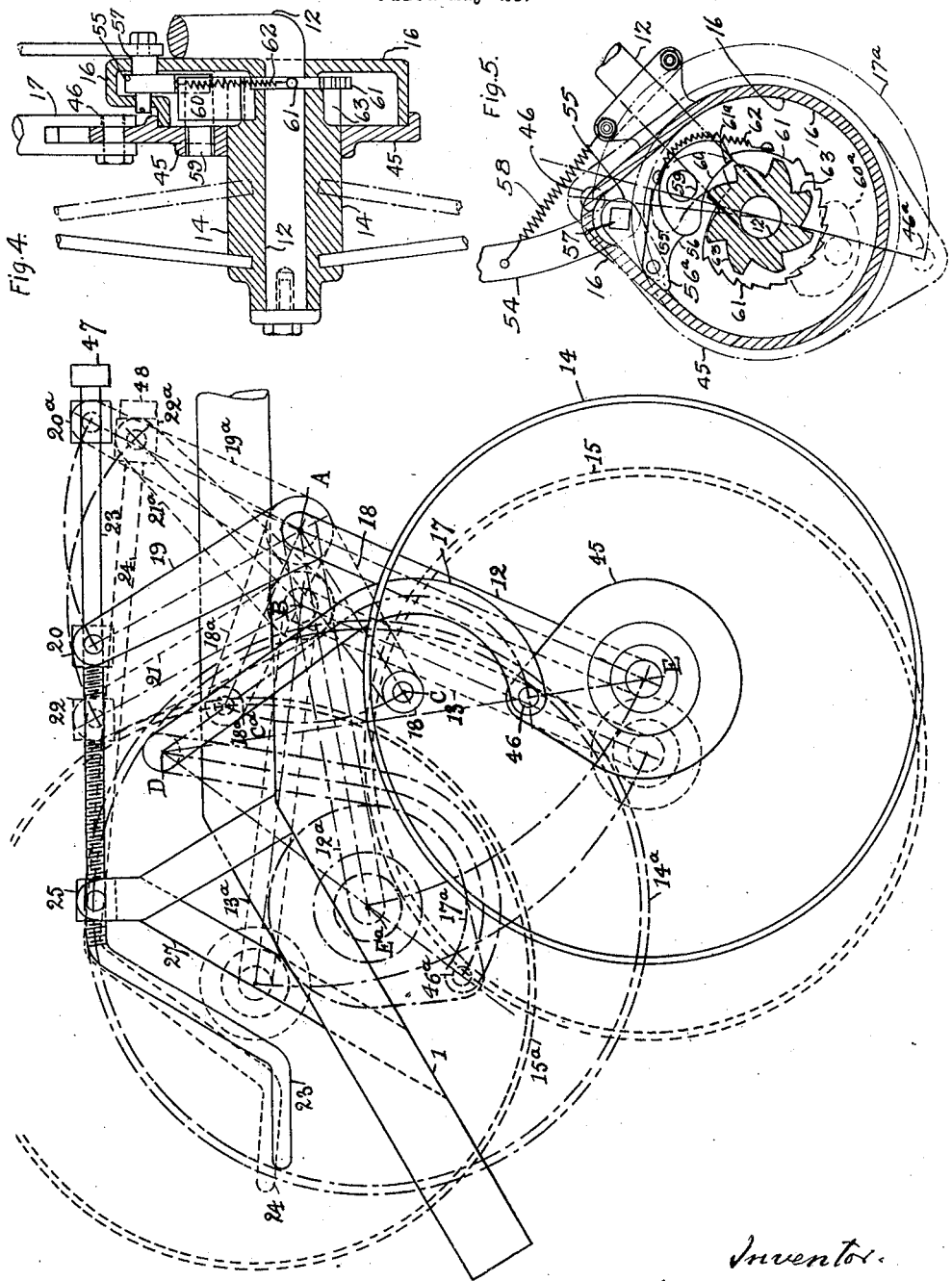

UNITED STATES PATENT OFFICE.

MAURICE PLANESS, OF ALGER, FRANCE.

PLOW.

Application filed May 23, 1924, Serial No. 715,468, and in France September 4, 1923.

My invention relates to agricultural implements, and more particularly to a plow designed for work in vineyards. The principal object of my invention is to produce a plow which can be used either as a plain plow for turning over the soil, or as a hoeing implement, or a cultivator.

The new plow is provided with a lifting mechanism mounted on the axle of one of the front wheels, and so constructed as to enable the plow to be automatically and instantaneously lifted so that it will clear the ground as it is turned to assume a different direction.

A regulating device is also provided acting on the wheel axles to automatically adjust the working depth of the plow and its position when passing over uneven ground. In the annexed drawing, in which I have illustrated one embodiment of my invention by way of example, Figs. 1 and 1ª are a side elevation of the complete plow and Figs. 2 and 2ª a corresponding plan view thereof. Fig. 3, drawn to a larger scale, is a side elevation of the lifting mechanism and the depth regulating device, while Figs. 4 and 5 are sections through the lifting mechanism.

According to the drawing, the main frame is preferably formed of longitudinal members 1 and transverse members 2. To the latter are removably secured curved arms 3 carrying at their lower enlarged ends 7 plow shares 8 provided with mould boards 9. The spacing between the arms 3 can be readily varied by using different openings provided in member 1, as indicated in the drawing.

On frame 1 are provided the supports 10 and 11 for plate crank-shaped front axles 12 and 13 on which are mounted left and right hand front wheels 14 and 15 respectively.

The lifting mechanism comprises a crank-arm 17 which is connected by means of a pin 46 to a cam-disc 45 mounted on the axle 12. The latter passes through the centre of a casing 16 enclosing the lifting mechanism to be more fully described hereafter. On the end of axle 12 is mounted the hub of the left-hand wheel 14. The cam-disc 45, which forms a cover for casing 16 and is mounted on said wheel-hub, is rotatable. The axles 12 and 13 are coupled by means of a lever 18 secured at one end to axle 12 and having a roller bearing at the outer end rolling on axle 13. 31 and 32 indicate compensating springs secured at one end to the frame 1 and at the other end to arms 29 and 30 mounted on the axles 12 and 13 respectively, which springs act to facilitate the lifting of the plow.

The power required to lift the plow is furnished by the tractive force, the left hand front wheel 14 being used as a medium for the transmission of such force. Fig. 3 illustrates the various positions occupied by the parts of the lifting mechanism, the full lines showing the position of the left-hand wheel 14 when the plow has been lifted, while the broken lines indicate the position of said wheel when the plow has been lowered to the maximum depth. The right hand wheel 15 is shown in broken lines in both positions.

When pin 46 is pushed backwards, cam disc 45 rotates to the right in Fig. 3, in which case crank arm 17 and axle 12 describe a circle about the point A and the point D respectively (Fig. 3), until they reach the broken line positions 12ª and 17ª. The wheel 14 then occupies the position 14ª (maximum depth of the plow share).

The coupling lever 18 which transmits the movements of the left-hand wheel 14 to the right-hand wheel 15, is so arranged that the two axles, when the plow is lowered become uncoupled and that the right-hand axle will be lifted to the same height as the left-hand axle when the plow is lifted.

This coupling lever 18 rotates with the axle 12 and on the plow being lowered assumes the broken-line position 18ª (Fig. 3). The right hand axle 13 is now free to also rotate about its point of rotation B assuming the broken-line position 13ª. The right-hand wheel 15 will then occupy the position 15ª (maximum depth). During said movement, the end of the coupling lever 18 describes about the point A a circle having the radius A—C. The point of support of lever 18 on axle 13 describes about the point B a circle having the radius B—C. Since A—C is larger than B—C, the arc covered by the end of the lever 18 is greater than that covered by the point C on the axle 13. Consequently, once the plow has been lowered, the two wheels 14 and 15 can, to a certain extent, freely move relative to each other, which allows independent adjustment of each wheel as to depth as the plow passes over uneven ground. However, when the plow is lifted, both wheels will always occupy the same level.

The lifting movement is transmitted from the front wheels to a rear-wheel 36 by means of an adjustable connecting bar 39, one end of which is connected to a lever arm 19 mounted on the axle 12, while the other end is secured to a lever 37 bearing on a projection of the axle box 34 of the axle 35 of the rear wheel 36. In this manner, the lever 37 of the rear wheel is controlled by the lever arm 19.

The adjustment of the maximum working depth of the plow shares is effected by means of crank rods 23 and 24 extending through threaded nuts 25 and 26 pivoted to brackets 27 and 28 of frame 1. The same crank rods are provided along a portion of their length with screw threads engaging those of the threaded nuts 25 and 26, and they extend freely through sleeves 20 and 22 pivoted to the free ends of the crank arms 19 and 21 mounted on the axles 12 and 13. When the plow is lowered, the arms 19 and 21 rotate together with the axles 12 and 13, the said sleeves 20 and 22 sliding along the rods 23 and 24 until stopped by abutments 47 and 48 provided at the ends of the said rods. Consequently, as the crank rods 23 and 24 are screwed more or less far in the nuts 25 and 26, the position of the abutments 47 and 48 is thereby altered, and thus the extent of the rotary movement permitted to the arms 19 and 21, and thereby also the extent of the rotation of the axles 12 and 13 is limited, and thereby the working depth of the plow shares is correspondingly varied.

According to Figs. 4 and 5, the hub of the wheel 14 is formed at its inner end with a toothed wheel 63 which projects into the casing 16 fixed on the axle 12 of the wheel 14.

On the smooth cylindrical portion of the hub is rotatably mounted cam disc 45 which is connected to crank arm 17 by pin 46. The disc 45 carries a trunnion 59 carrying a pawl 60. On the axle 12 between the wall of the casing 16 and the toothed wheel 63 integral with the hub is mounted a toothed disc 61, which is connected to the pawl 60 by means of a coil spring 62.

By means of operating lever 54, mounted on a short shaft 57 and which is maintained in its position by a spring 58, the lever 55 and its pawl 56, the various movements of the mechanism are started.

When the plow is in its working position, the left hand wheel 14 can rotate freely on its axle 12 and the shares 8 remain at the depth limited by the abutments 47 and 48 of the crank rods 23 and 24.

In order to lift the plow, the wheel 14 is coupled with its hub by levers 54, 55. The rotation of wheel 14 is then transmitted to cam disc 45 which acts on the crank arm 17 in such a manner, that pin 46 describes a circle firstly about the centre E of the wheel (Fig. 3) in the position $E^a$, and secondly about the centre D of rotation of the crank arm 17.

By this movement, the centre E of the wheel is compelled to turn about A passing from $E^a$ to E (Fig. 3). The plow is thus lifted, until the axis of the pinion 46 of the cam disc 45 comes to be situated in the plane passing through axis D of the crank arm 17 and axis E of the wheel (dead centre). At this moment, further rotation is stopped in the manner described hereafter, and the plow remains in its position. The coupling between wheel 14 and cam disc 45 automatically ceases, and the wheel again can freely rotate about its axle.

In order to lower the plow, it is sufficient to push backwards pin 46 of cam-disc 45, until it passes out of the plane D—E. At this moment, the plow drops by its own weight to the depth determined by the arms 19 and 21 and the abutments 47 and 48 of the crank rods 23, 24.

The maximum depth is reached when the axis E is at $E^a$, between the axis D and pin 46, in the same plane. The crank arm 17 then occupies the position indicated by the broken lines in Fig. 3.

When the plow is working, pin 46 of cam-disc 45 occupies the position $46^a$ (maximum depth) and the pawl 60 occupies the position $60^a$. The pawl is maintained out of engagement with the teeth 63 of the hub of wheel 14 by the disc 61 which by the action of spring 62 has been raised under pawl 60 maintaining the same in its notch $61^a$.

Now, if the lever arm 54 is pulled against spring 58, the lever arm 55 moves forwards, the nose $56^a$ of pawl 56 becomes disengaged from the wall of the casing 16 and drops, and its point $56^b$ contacts with disc 61 and engages the teeth of the disc 61, thus causing the latter to rotate. The disc 61 thereby is released from the pawl 60, which moves out of the notch $61^a$ and under the action of the spring 62 engages the teeth 63 of the hub of wheel 14 due to the large opening in disc 61. The latter as it rotates is then coupled to the cam disc 45, and the latter shares in the rotation of the wheel.

Spring 58 meanwhile has caused lever arm 54 to return to its initial position, and the lever arm 55 has moved backwards and has pushed the nose $56^a$ of the pawl 56 against the wall of casing 16, i. e. the pawl 56 has become disengaged from disc 61 and has returned to the position indicated in Fig. 5.

The crank disc 45 continues rotation with the wheel and, through the medium of the crank arm 17, lifts the plow.

Shortly before it has reached the dead centre position, the projection of pawl 60 bears against the concave portion of pawl 56, and in continuing its movement, the projection of pawl 60, because of the concave surface of the pawl 56, now fixed in position, is compelled thereby to move downwards, the tail of the pawl 60 being thereby lifted and beginning to move out of the teeth 63 of the hub. Having reached the position illustrated in the drawing, the pawl 60 has become completely disengaged from the teeth 63, and the disc 61, under the action of the spring, has been moved under the pawl 60, which is thereby maintained clear of the teeth 63.

The cam disc 45, the pin 46 of which has moved beyond the dead centre, remains locked in the raised position, while the wheel being disengaged from the cam disc continues to rotate.

For lowering the plow, one again exerts a pull on the lever arm 54. This time, the pawl 56 cannot drop, but abuts against the pawl 60, causing the same to rotate with the disc 61 and cam-disc 45 about the axle 12. When the pin 46 has passed beyond the dead centre, the plow drops by reason of its own weight.

It is obvious that various other constructions may be adopted without any departure from the nature of the invention, and also the details of construction may be varied according to the requirements of each case.

I claim:

1. In plows having two wheel axles, the combination with the main frame, of a power lift mechanism adapted to be operated by the traction pull of the tractor and comprising a crank disk rotatably mounted on one of the wheel axles, a crank arm, a trunnion operatively connecting the said crank arm with said crank disk, a casing fixed on the said wheel axle and being closed by said crank disk, a wheel journalled on said axle, the hub of said wheel forming a bearing for said crank disk, teeth formed on said hub inside said casing, a pawl pivotally carried by said crank disk and adapted to engage said teeth, a toothed disk rotatably mounted on said axle, a spring connecting the said toothed disk and the said pawl, a spring-controlled lever cooperating with said pawl and toothed disk for coupling the said wheel with the said crank disk so as to cause the latter to rotate with the said wheel, thereby lifting the plow through the medium of the said crank arm, and means for releasing said pawl permitting the free rotation of said wheel.

2. In the combination specified in claim 1, a coupling lever fixed to and rotating with one of the said wheel axles and normally bearing on the other wheel axle, the radius of the circle described by the end of the said coupling lever being larger than the radius of the arc described by the points at which the said coupling lever bears on the said wheel axle to cause uncoupling of said axles upon lowering of the plow.

3. The combination as specified in claim 1, comprising also regulating rods provided with screw threads and crank handles, threaded nuts engaging said rods, and provided with lateral trunnions, brackets secured to the said main frame receiving said trunnions, crank arms secured to the said wheel axles and having trunnioned to their free ends sleeves adapted to receive the said rods and to slide along the same, upon the movement of the said crank arms, and abutments for said sleeves for limiting the extent of movement of the said crank-arms and thereby the rotation of the said wheel axles about their points of rotation, thus controlling the working depth of the plow.

In testimony whereof he has affixed his signature.

MAURICE PLANESS.